(12) United States Patent
Hubacek et al.

(10) Patent No.: US 7,070,756 B2
(45) Date of Patent: Jul. 4, 2006

(54) PROCESS FOR PRODUCING ZINC SULFIDE PARTICLES

(75) Inventors: Milan Hubacek, Kanagawa-ken (JP); Kenji Takahashi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/902,208

(22) Filed: Jul. 30, 2004

(65) Prior Publication Data

US 2005/0002853 A1  Jan. 6, 2005

(30) Foreign Application Priority Data

Aug. 4, 2003  (JP)  ............................. 2003-285787

(51) Int. Cl.
*C01G 9/08*  (2006.01)
*C09K 11/56*  (2006.01)

(52) U.S. Cl. ........................ 423/566.1; 252/301.6 S; 427/64; 427/215

(58) Field of Classification Search ............ 423/566.1; 252/301.6 S; 427/64, 215
See application file for complete search history.

(56) References Cited

U.S. PATENT DOCUMENTS 6,153,123 A * 11/2000 Hampden-Smith et al. ................ 252/301.4 S
6,193,908 B1 * 2/2001 Hampden-Smith et al. ................ 252/301.4 R
2003/0172868 A1 * 9/2003 Nho et al. ..................... 117/81

FOREIGN PATENT DOCUMENTS

| JP | 53-64693 | * | 6/1978 |
| JP | 55-149376 | * | 11/1980 |
| JP | 60-33215 | * | 2/1985 |
| JP | 60-67584 A | | 4/1985 |
| JP | 60-67585 | * | 4/1985 |
| JP | 4-58517 B2 | | 9/1992 |
| JP | 9-13029 | * | 1/1997 |

* cited by examiner

*Primary Examiner*—Stanley S. Silverman
*Assistant Examiner*—Ardith E. Hertzog
(74) *Attorney, Agent, or Firm*—Sughrue Mion, PLLC

(57) ABSTRACT

A mixed melt, which contains urea and/or a urea derivative and contains a sulfur source and a zinc source, is prepared. A temperature of the mixed melt is raised, and a precipitate of zinc sulfide is thereby formed. The temperature of the mixed melt is raised even further, and a solid material containing the zinc sulfide is thereby formed. The solid material is fired, and organic constituents contained in the solid material are thus removed. Zinc sulfide particles having uniform particle size and free from inclusion of impurities are thus produced without any precipitant being added.

16 Claims, No Drawings

PROCESS FOR PRODUCING ZINC SULFIDE PARTICLES

BACKGROUND OF THE INVENTION

1. Field of the Invention

This invention relates to a urea melting technique. This invention particularly relates to a process for producing zinc sulfide particles with the urea melting technique.

2. Description of the Related Art

Zinc sulfide phosphors have heretofore been utilized for luminous paint compositions, cathode ray tubes, fluorescent plates of electronic microscopes, electroluminescence (EL) devices, and the like. As an activator, silver, copper, manganese, or the like, has heretofore been added to the zinc sulfide phosphors. Also, as a co-activator, aluminum, a halogen, or the like, has heretofore been added to the zinc sulfide phosphors.

As one of techniques for producing zinc sulfide, there has heretofore been known a technique, wherein hydrogen sulfide is introduced to a saturation point into an aqueous zinc oxide solution, which is kept in an acidic state by use of a buffer, and zinc sulfide is thus precipitated. As another technique for producing zinc sulfide, there has heretofore been known a technique, wherein thiourea, or the like, is added to an aqueous alkali solution containing zinc ions and caused to undergo a reaction.

However, with the aforesaid conventional techniques for producing zinc sulfide, zinc sulfide particles having particle diameters distributed over a wide range are obtained. In order for uniform particle size to be obtained, it is necessary for various adjustments, such as a pH adjustment, to be performed during the production processing. Also, in cases where an activator or a co-activator is added to zinc sulfide having been obtained with the aforesaid conventional techniques for producing zinc sulfide, and the resulting mixture is subjected to heat treatment, abnormal particle growth is apt to occur, and a zinc sulfide phosphor having uniform particle size is not always capable of being obtained. Further, the zinc sulfide phosphors are markedly apt to suffer from adverse effects of impurities, and light emission intensity of the zinc sulfide phosphors becomes low in cases where $10^{-6}$ mol of iron, cobalt, nickel, or the like, mixes into the zinc sulfide phosphors. However, with the aforesaid conventional techniques for producing zinc sulfide, wherein zinc sulfide crystals are precipitated from the aqueous solution, impurities readily mix in to the zinc sulfide phosphors, and it becomes necessary for particular processing for, for example, removing the impurities, to be performed.

A technique for producing a zinc sulfide phosphor, which has a smaller particle diameter and more uniform particle diameter and exhibits a higher luminance than those of the zinc sulfide phosphors having been produced with the aforesaid conventional techniques for producing zinc sulfide, is described in, for example, Japanese Patent Publication No. 4(1992)-58517. The technique for producing a zinc sulfide phosphor, which is described in Japanese Patent Publication No. 4(1992)-58517, comprises a first step of mixing and melting thiourea, a zinc salt, and an activator in order to prepare a molten salt, a second step of subjecting at least either one of ammonia and an alkali hydroxide to a reaction with the molten salt, zinc sulfide containing the activator being thereby precipitated, and a third step of firing the zinc sulfide precipitate under an inert atmosphere or a sulfurizing atmosphere.

The technique for producing a zinc sulfide phosphor, which is described in Japanese Patent Publication No. 4(1992)-58517, comprises the second step of subjecting at least either one of ammonia and an alkali hydroxide to a reaction with the thiourea melt, zinc sulfide containing the activator being thereby precipitated. With the second step described above, a precipitant, such as an ammonia gas or the alkali hydroxide, is added to the thiourea melt, and zinc sulfide containing the activator is thereby precipitated. However, in the cases of the reaction utilizing the precipitant described above, the problems occur in that, if the precipitant is not uniformly added to the thiourea melt, uniformity of the zinc sulfide phosphor will not be capable of being obtained.

SUMMARY OF THE INVENTION

The primary object of the present invention is to provide a process for producing zinc sulfide particles, wherein zinc sulfide particles, which have uniform size and are free from inclusion of impurities, are capable of being produced without a precipitant being added.

Another object of the present invention is to provide a process for producing zinc sulfide particles, wherein zinc sulfide particles, which enable a fluorescent film exhibiting a high light emission intensity to be obtained, are capable of being produced.

A further object of the present invention is to provide a process for producing zinc sulfide particles, wherein zinc sulfide particles, in which a surface of a zinc sulfide particle precursor has been covered with a metal compound, are capable of being obtained.

The present invention provides a first process for producing zinc sulfide particles, comprising the steps of:

i) preparing a mixed melt, which contains urea and/or a urea derivative and contains a sulfur source and a zinc source, ii) raising a temperature of the mixed melt, a precipitate of zinc sulfide being thereby formed, iii) raising the temperature of the mixed melt even further, a solid material containing the zinc sulfide being thereby formed, and iv) firing the solid material, organic constituents contained in the solid material being thereby removed.

The present invention also provides a second process for producing zinc sulfide particles, comprising the steps of:

i) preparing a zinc sulfide particle precursor by:
 a) preparing a mixed melt, which contains urea and/or a urea derivative and contains a sulfur source and a zinc source,
 b) raising a temperature of the mixed melt, a precipitate of zinc sulfide being thereby formed,
 c) raising the temperature of the mixed melt even further, a solid material containing the zinc sulfide being thereby formed, and
 d) grinding the solid material, ii) preparing a metal compound-containing material by:
 a) preparing a mixed melt, which contains urea and/or a urea derivative and contains a metal compound,
 b) raising a temperature of the mixed melt, a solid material containing the metal compound being thereby formed, and
 c) grinding the solid material, iii) mixing the zinc sulfide particle precursor and the metal compound-containing material with each other, and iv) firing the resulting mixture of the zinc sulfide particle precursor and the metal compound-containing material, organic constituents contained in the mixture of the zinc sulfide particle precursor and the metal compound-containing material being thereby removed.

In the first and second processes for producing zinc sulfide particles in accordance with the present invention, the mixed melt, which contains urea and/or the urea derivative and contains the sulfur source and the zinc source, may further contain constituents, which are other than urea and/or the urea derivative, the sulfur source, and the zinc source. Also, in the second process for producing zinc sulfide particles in accordance with the present invention, the mixed melt, which contains urea and/or the urea derivative and contains the metal compound, may further contain constituents, which are other than urea and/or the urea derivative and the metal compound.

In the first and second processes for producing zinc sulfide particles in accordance with the present invention, the temperature of the mixed melt, which contains urea and/or the urea derivative and contains the sulfur source and the zinc source, is raised. In such cases, the term "raising a temperature of a mixed melt" as used herein means that the temperature of the mixed melt is raised until the precipitate of zinc sulfide is formed in the mixed melt. Also, the term "forming a precipitate" as used herein means that the precipitate of zinc sulfide is formed without any precipitant being added. Further, the term "forming a solid material" as used herein means that urea and/or the urea derivative is decomposed to yield the solid material.

The zinc sulfide particles maybe the particles of pure zinc sulfide. Alternatively, as in the cases of a zinc sulfide phosphor having been activated with an activator, or the like, the zinc sulfide particles may be the zinc sulfide particles containing metal ions other than $Zn^{2+}$, which metal ions are capable of functioning efficiently, in a dispersed form. As another alternative, the zinc sulfide particles may be the zinc sulfide particles covered with a metal compound other than zinc sulfide, which metal compound is capable of functioning efficiently.

Each of the first and second processes for producing zinc sulfide particles in accordance with the present invention should preferably be modified such that the sulfur source contains an $S^{2-}$ ion and/or an $S^{6+}$ ion. Also, each of the first and second processes for producing zinc sulfide particles in accordance with the present invention should preferably be modified such that the sulfur source is at least one kind of a compound selected from the group consisting-of zinc sulfate, $(NH_4)_2SO_4$, and thiourea. Zinc sulfate is capable of being utilized as both the sulfur source and the zinc source.

Further, each of the first and second processes for producing zinc sulfide particles in accordance with the present invention should preferably be modified such that the mixed melt further contains a doping agent. The term "doping agent" as used herein means an appropriate amount of an impurity, which is added in order to alter the physical properties or the chemical properties of zinc sulfide. By way of example, the doping agent may be an activator or a co-activator, which takes part in light emission, or a fusing agent for promoting crystal growth and diffusion of impurities.

With the first process for producing zinc sulfide particles in accordance with the present invention, the melt of urea and/or the urea derivative is used as a solvent. Therefore, at the time at which urea and/or the urea derivative is decomposed, and the melt is solidified, the zinc sulfide formed in the melt does not readily agglomerate. Also, there is no risk that a hydrolysate will be formed as in cases where water is utilized as a solvent. Accordingly, the zinc sulfide particles are capable of being produced, while the zinc sulfide particles are being kept in a well dispersed state.

Also, in cases where water is utilized as a solvent, since the solubility of zinc ions in water is low, it is not always possible to form zinc sulfide particles having a submicron size. However, the solubility of the zinc ions in urea and/or the urea derivative, which has been melted, is high. Therefore, with the process for producing zinc sulfide particles in accordance with the present invention, the zinc sulfide particles having the submicron size are capable of being formed easily. In cases where zinc sulfide phosphor particles having the submicron size are prepared by use of the zinc sulfide particles having been produced with the process for producing zinc sulfide particles in accordance with the present invention, and a fluorescent film is formed by use of the zinc sulfide phosphor particles, a fluorescent film exhibiting a high light emission intensity is capable of being obtained.

Further, with the process for producing zinc sulfide particles in accordance with the present invention, the temperature of the mixed melt, which contains urea and/or the urea derivative and contains the sulfur source and the zinc source, is raised, and the precipitate of zinc sulfide is thereby formed. Therefore, the process for producing zinc sulfide particles in accordance with the present invention is free from the problems in that, if a precipitant is not uniformly added to a melt, uniformity of the zinc sulfide particles is not capable-of being obtained. With the process for producing zinc sulfide particles in accordance with the present invention, the zinc sulfide particles having uniform particle size are thus capable of being obtained. Furthermore, in the cases of a technique wherein zinc sulfide is caused to precipitate by the addition of a precipitant, there is the risk of impurities due to the precipitant being included in the zinc sulfide. However, with the process for producing zinc sulfide particles in accordance with the present invention, inclusion of impurities due to a precipitant does not occur, and the zinc sulfide particles free from impurities are capable of being produced.

With the second process for producing zinc sulfide particles in accordance with the present invention, the zinc sulfide particle precursor is prepared by: (a) preparing the mixed melt, which contains urea and/or the urea derivative and contains the sulfur source and the zinc source, (b) raising the temperature of the mixed melt, the precipitate of zinc sulfide being thereby formed, (c) raising the temperature of the mixed melt even further, the solid material containing the zinc sulfide being thereby formed, and (d) grinding the solid material. Also, the metal compound-containing material is prepared by: (a) preparing the mixed melt, which contains urea and/or the urea derivative and contains the metal compound, (b) raising the temperature of the mixed melt, the solid material containing the metal compound being thereby formed, and (c) grinding the solid material. Further, the zinc sulfide particle precursor and the metal compound-containing material are mixed with each other. Furthermore, the resulting mixture of the zinc sulfide particle precursor and the metal compound-containing material is fired, and the organic constituents contained in the mixture of the zinc sulfide particle precursor and the metal compound-containing material are thereby removed. Therefore, with the second process for producing zinc sulfide particles in accordance with the present invention, the zinc sulfide particles, in which the surface of the zinc sulfide particle precursor has been covered with the metal compound, are capable of being obtained. Accordingly, the zinc sulfide is capable of being prevented from becoming sintered. Also, in cases where the zinc sulfide is utilized as a phosphor for EL devices, the formation of an interface level acting as an electron source becomes possible.

DETAILED DESCRIPTION OF THE INVENTION

The first process for producing zinc sulfide particles in accordance with the present invention comprises the steps of: (i) preparing a mixed melt, which contains urea and/or a urea derivative and contains a sulfur source and a zinc source, (ii) raising a temperature of the mixed melt, a precipitate of zinc sulfide being thereby formed, (iii) raising the temperature of the mixed melt even further, a solid material containing the zinc sulfide being thereby formed, and (iv) firing the solid material, organic constituents contained in the solid material being thereby removed.

Examples of the urea derivatives for constituting the mixed melt include thiourea, carbohydrazide, benzene sulfonyl hydrazide, trimethylurea, triethylurea, tetramethylurea, tetraethylurea, triphenylurea, and tetraphenylurea. Thiourea is capable of acting both the urea and/or the urea derivative and the sulfur source. Specifically, in cases where thiourea is utilized, the mixed melt is capable of being constituted of the thiourea and the zinc source.

Examples of preferable zinc sources include ZnO, $Zn(OH)_2$, $ZnSO_4$, $Zn(NO_3)_2$, $Zn3(PO_4)$, $ZnCO_3$, $ZnCl_2$, and $ZnBr_2$.

The sulfur source should preferably contain an $S^{2-}$ ion and/or an $S^{6+}$ ion. Also, the sulfur source should preferably be at least one kind of a compound selected from the group consisting of zinc sulfate, $(NH_4)_2SO_4$, and thiourea. Further, as the sulfur source, at least two kinds of compounds selected from the group consisting of zinc sulfate, $(NH_4)_2SO_4$, and thiourea may be used in combination.

The mixed melt may further contain a doping agent. Examples of the doping agents include metal ions of Mn, Cu, Al, Ag, Mg, Cd, Tl, and rare earth elements (such as Ce, Pr, Nd, Eu, Gd, Tb, Er, and Tm); and halogen ions. The doping agent may be added in the form of a halide, a nitrate, a sulfate, or an acetate of a metal. The doping agent is included in the zinc sulfide during heating processing, which will be described later. The doping agent thus activates the zinc sulfide and acts as the activator, or the like.

The mixed melt, which contains urea and/or the urea derivative and contains the sulfur source and the zinc source, may be prepared in the manner described below. Specifically, urea and/or the urea derivative, the sulfur source, and the zinc source are introduced into a reaction vessel, such as a separable flask, and heated to a temperature equal to at least the melting temperature of urea (135° C.) (in the cases of thiourea, at least the melting temperature of thiourea, 180° C.; or in the cases of carbohydrazide, at least the melting temperature of carbohydrazide, 152° C. to 153° C.). The zinc source is dissolved in the melt of urea and/or the urea derivative, and a uniform mixed melt is formed. The mixing ratio of urea and/or the urea derivative to the zinc source may vary in accordance with the kind of the zinc source. In order for a uniform melt to be obtained, for example, the mixing ratio of thiourea:the zinc source or the mixing ratio of urea:the zinc source should preferably be at least 1:1 (molar ratio).

The raising of the temperature of the mixed melt, which contains urea and/or the urea derivative and contains the sulfur source and the zinc source, is performed until a precipitate of zinc sulfide is formed in the mixed melt, and the urea and/or the urea derivative is solidified. The temperature of the mixed melt is raised to a temperature equal to at least the melting temperature of urea and/or the urea derivative. Specifically, the temperature of the mixed melt should preferably be raised to a temperature falling within the range of 200° C. to 600° C., and should more preferably be raised to a temperature falling within the range of 350° C. to 500° C. The heating time may vary in accordance with the heating temperature. The heating time should preferably fall within the range of 10 minutes to 24 hours, and should more preferably fall within the range of 1 hour to 12 hours. In order for the temperature of the mixed melt to be raised, the mixed melt, which has been prepared by the addition of the zinc source to urea and/or the urea derivative and the sulfur source having been melted, may be heated with stirring. The heating of the mixed melt may be performed such that the temperature of the mixed melt is kept at a predetermined temperature during the heating, or such that the temperature of the mixed melt is raised gradually. The heating atmosphere may be an oxidizing atmosphere, such as the air; a neutral atmosphere, such as an $N_2$ gas or an Ar gas; or a vacuum.

During the heating step, urea and/or the urea derivative, which is contained in the mixed melt, decomposes to yield a decomposition product. Part or all of the decomposition product dissipates as a combustible gas, and the mixed melt solidifies gradually. The thus obtained solid material contains the organic constituents, which have been formed through the decomposition of urea, and the like. Therefore, the solid material should preferably be subjected to grinding process performed with a grinding technique utilizing a ball mill, a jet mill, a pin mill, or the like.

Thereafter, the solid material is fired. By way of example, the firing may be performed with a technique, wherein the solid material having been ground is filled in a heat-resistant vessel, such as a quartz boat, an alumina crucible, or a quartz crucible, and the heat-resistant vessel containing the solid material having been ground is set at a furnace core of an electric furnace. The firing temperature may vary in accordance with the state of the solid material precursor, and the like. The firing temperature may fall within the range of 600° C. to 1,300° C. The firing temperature should preferably fall within the range of 700° C. to 1,200° C., and should more preferably fall within the range of 800° C. to 1,100° C. The firing time may vary in accordance with the firing temperature. The firing time may fall within the range of 10 minutes to 100 hours, and should preferably fall within the range of 30 minutes to 10 hour. The firing atmosphere may be an oxidizing atmosphere, such as the air; a neutral atmosphere, such as an $N_2$ gas or an Ar gas; a weakly reducing atmosphere, which is formed in cases where the solid material and carbon are put in a covered firing vessel and fired in the air or vacuum.

In cases where the solid material having been ground is subjected to the firing processing, decomposition products, which have been formed during the firing processing, are capable of being dissipated, the organic constituents are capable of being removed from the solid material, and the zinc sulfide particles are capable of being produced. In cases where the doping agent has been used, the doping agent is uniformly dispersed and contained as metal ions, or the like, in the zinc sulfide particles during the heating processing and the firing processing described above and thus activates the compound (e.g., activates a phosphor). The particle diameter of the thus obtained zinc sulfide particles may fall within the range of 50 nm to 10 μm, and should preferably fall within the range of 100 nm to 3 μm.

The second process for producing zinc sulfide particles in accordance with the present invention comprises the steps of:

i) preparing a zinc sulfide particle precursor by: (a) preparing a mixed melt, which contains urea and/or a urea derivative and contains a sulfur source and a zinc source, (b) raising a temperature of the mixed melt, a precipitate of zinc sulfide being thereby formed, (c) raising the temperature of the mixed melt even further, a solid material containing the zinc sulfide being thereby formed, and (d) grinding the solid material, ii) preparing a metal compound-containing material by: (a) preparing a mixed melt, which contains urea and/or a urea derivative and contains a metal compound, (b) raising a temperature of the mixed melt, a solid material containing the metal compound being thereby formed, and (c) grinding the solid material, iii) mixing the zinc sulfide particle precursor and the metal compound-containing material with each other, and iv) firing the resulting mixture of the zinc sulfide particle precursor and the metal compound-containing material, organic constituents contained in the mixture of the zinc sulfide particle precursor and the metal compound-containing material being thereby removed.

With the second process for producing zinc sulfide particles in accordance with the present invention, the zinc sulfide particles, in which the surface of the zinc sulfide particle precursor has been covered with the metal compound, are capable of being obtained.

In the second process for producing zinc sulfide particles in accordance with the present invention, in cases where the temperature of the mixed melt, which contains urea and/or the urea derivative and contains the sulfur source and the zinc source, is raised, and the precipitate of zinc sulfide is thereby formed, a doping agent may be added to the mixed melt, and the zinc sulfide particle precursor may thus be prepared. Alternatively, the zinc sulfide particle precursor may be prepared without the doping agent being added to the mixed melt. Also, at the stage at which the zinc sulfide particle precursor is covered with the metal compound, the doping agent may be added together with the metal compound. In the latter case, the covering of the zinc sulfide particles with the metal compound is capable of being achieved at the same time as the introduction of the activator into the zinc sulfide particles. Specifically, in the latter case, at the same time as the processing for forming the covering layer, the additive, such as the doping agent, is capable of being dispersed and contained in the core particles.

The metal compound utilized for covering the surface of the zinc sulfide particle precursor may be a dielectric material, an electrically conductive material, a phosphor, an activator, or the like. Examples of preferable metals of the metal compounds include alkali metals (such as Li, Na, and K), alkaline earth metals (such as Mg, Ca, Sr, and Ba), B, Al, Si, Sc, Ti, Cr, Fe, Co, Ni, Cu, Zn, Ga, Y, Zr, Nb, Ag, Cd, In, Sn, Hg, Pb, and rare earth elements (such as Ce, Pr, Eu, Gd, Dy, Ho, Er, Tm, Yb, Lu, Th, and U). However, it is necessary for the metal to have the characteristics such that, at the time at which the metal covers the surfaces of the particles of the zinc sulfide particle precursor, the metal does not undergo a chemical reaction, or the like, with the zinc sulfide particle precursor, and the covering metal compound is capable of adhering to the surfaces of the particles of the zinc sulfide particle precursor.

The covering metal compound may be used in the form of a salt, such as a nitrate, a sulfate, or an acetate. The covering metal compound should preferably be used in the form of a nitrate or a sulfate, and should preferably be used in the form of a nitrate. One kind of the metal compound need not necessarily be used alone, and at least two kinds of the metal compounds may be used in combination.

In cases where the surfaces of the particles of the zinc sulfide particle precursor are covered with the covering metal compound, the zinc sulfide is capable of being prevented from becoming sintered during the firing processing. Also, in cases where the zinc sulfide is utilized as a phosphor for EL devices, the formation of an interface level acting as an electron source becomes possible.

In order for the surface of the zinc sulfide particle precursor to be covered with the metal compound, urea and/or the urea derivative and the covering metal compound are introduced into a reaction vessel, such as a separable flask, and heated to a temperature equal to at least the melting temperature of urea or the urea derivative, and the melt is thereby prepared. The metal compound is dissolved in the melt, and a uniform melt is formed. The mixing ratio of urea and/or the urea derivative to the covering metal compound may vary in accordance with the kind of the metal compound. In order for a uniform melt to be obtained, the mixing ratio of urea:the metal compound should preferably be at least 1:1 (molar ratio).

A small amount of an organic additive, such as sucrose, may be added to the mixed melt. By the addition of the organic additive to the mixed melt, the covering metal compound contained in the melt is capable of being imparted with adhesive properties. Therefore, the adhesion of the covering metal compound to the surfaces of the particles of the zinc sulfide particle precursor is, capable of being facilitated, and the characteristics of the covering of the particle surfaces are capable of being enhanced.

The melt described above is heated with stirring to a temperature equal to at least the melting temperature of urea and/or the urea derivative. As in the cases of the preparation of the zinc sulfide particle precursor, the heating temperature may fall within the range of 350° C. to 550° C., and the heating time may fall within the range of 10 minutes to 24 hours. The heating of the mixed melt may be performed such that the temperature of the mixed melt is kept at a predetermined temperature during the heating, or such that the temperature of the mixed melt is raised gradually. Also, the heating may be performed under one of various heating atmospheres.

During the heating step, urea and/or the urea derivative, which is contained in the mixed melt, decomposes to yield a decomposition product. Part or all of the decomposition product dissipates as a combustible gas, and the mixed melt solidifies gradually. At the same time, the covering metal constituent forms, for example, an oxide, a nitride, or an oxynitride and adheres to the surfaces of the dispersed particles of the zinc sulfide particle precursor. The thus obtained solid material contains the resin constituents, which have been formed through the decomposition of urea, and the like. Therefore, the solid material should preferably be subjected to grinding processing performed with a grinding technique utilizing a ball mill, a jet mill, a pin mill, or the like.

The thus ground material (i.e., the metal compound-containing material) and the solid material containing zinc sulfide, which solid material has been prepared in the manner described above, (i.e., the zinc sulfide particle precursor) are mixed with each other, and the resulting mixture is fired. The molar ratio of the zinc sulfide particle precursor to the covering metal compound may vary in accordance with a desired covering quantity. Ordinarily, the molar ratio of the zinc sulfide particle precursor to the covering metal compound may be between $10^6$:1 and 1:10. With the firing processing, organic constituents contained in the mixture of the zinc sulfide particle precursor and the metal compound-containing material are removed, and the zinc sulfide particles, whose surfaces have been covered with the metal oxide, metal nitride, or the metal oxynitride, are obtained. The metal compound having been formed as the covering layers on the surfaces of the particles of the zinc sulfide particle precursor takes on the form of an amorphous compound and/or a crystalline compound.

The firing temperature, at which the mixture of the zinc sulfide particle precursor and the metal compound-containing material is fired, may vary in accordance with the kind of the metal compound for constituting the covering layers, and the like. The firing temperature may fall within the range of 600° C. to 1,300° C. The firing temperature should preferably fall within the range of 700° C. to 1,200° C., and should more preferably fall within the range of 800° C. to 1,100° C. The firing time may vary in accordance with the firing temperature, the kind of the metal compound for constituting the covering layers, and the quantity of the metal compound. The firing time may fall within the range of 10 minutes to 100 hours, and should preferably fall within the range of 30 minutes to 10 hour. The firing atmosphere may be selected in accordance with the kind of the metal compound for constituting the covering layers. In cases where the metal compound is a metal oxide, the firing atmosphere should preferably be a neutral atmosphere, such as an inert gas atmosphere (He, Ne, Ar, N2, or the like), or an oxidizing atmosphere, such as an inert gas containing a small amount of oxygen ($N_2/O_2$, or the like). In cases where the metal compound is a metal nitride or a metal oxynitride, the firing atmosphere should preferably be a neutral atmosphere; an oxidizing atmosphere, such as an inert gas atmosphere containing a small amount of oxygen ($N_2/O_2$, or the like); or a reducing atmosphere containing ammonia, hydrogen, carbon monoxide, or the like. Alternatively, the firing conditions described above may be altered, and re-firing processing may be performed under the altered firing conditions.

The particle diameter of the zinc sulfide particles obtained in the manner described above may fall within the range of 50 nm to 10 µm, and should preferably fall within the range of 10 nm to 3 µm. The layer thickness of the covering layers should preferably fall within the range of 1 nm to 10 µm, and should more preferably fall within the range of 10 nm to 5 µm.

EXAMPLES

The present invention will further be illustrated by the following nonlimitative examples.

Example 1

Firstly, 108 g of urea containing 0.58 g of $Mn(NO_3)_2 \cdot 6H_2O$ was put in a separable flask, and the temperature was kept at 150° C. The urea was thus melted. After the urea was melted perfectly, 20 g of ZnO was added to the melt with vigorous stirring. Thereafter, the temperature was raised up to 190° C., and ZnO was thus perfectly dissolved in the urea. Also, 30 g of thiourea was added to the resulting melt. A slightly white precipitate was formed immediately, and the viscosity became markedly high. The temperature was raised gradually up to 450° C., and the mixed melt was thereby solidified. In this manner, a yellowish, hard, but brittle, solid precursor was obtained. The precursor was then ground, and the thus ground precursor was put in a quartz glass vessel and subjected to vacuum firing at a temperature of 1,030° C. for two hours. A ZnS:Mn phosphor was thus obtained. An X-ray diffraction analysis of the phosphor revealed that the product was a mixture of tetragonal ZnS and hexagonal ZnS.

Example 2

In lieu of $Mn(NO_3)_2 \cdot 6H_2O$ utilized in Example 1, 0.068 g of $CuSO_4 \cdot 5H_2O$ and 0.023 g of $Al_2(SO_4)_3 \cdot 7H_2O$ were dissolved in the molten urea, and a mixed melt was thus prepared. The temperature of the mixed melt was then raised up to 450° C., and the mixed melt was thus solidified. Thereafter, the thus solidified material was subjected to vacuum firing at a temperature of 1,030° C. for two hours. A ZnS: Al, Cu phosphor was thus obtained. ZnS had the same structure as that obtained in Example 1. The ZnS:Al, Cu phosphor exhibited deep green photoluminescence.

Example 3

Firstly, 108 g of urea was put in a separable flask, and the temperature was kept at 150° C. The urea was thus melted. After the urea was melted perfectly, 70.68 g of $ZnSO_4 \cdot 7H_2O$ was added to the melt with vigorous stirring. Thereafter, the temperature was raised. Precipitation began at a temperature of approximately 200° C. and was completed at a temperature of 240° C. In order to achieve reliable grinding, the temperature was raised to 450° C. After cooling, the precursor was ground, and the thus ground precursor was fired in a heating furnace at a temperature of 1,030° C. and at 10 Pa for two hours. ZnS particles were thereby obtained.

Example 4

Firstly, 108 g of urea was put in a separable flask, and the temperature was kept at 150° C. The urea was thus melted. After the urea was melted perfectly, 20 g of ZnO was added to the melt with vigorous stirring. Thereafter, the temperature was raised. After ZnO was dissolved perfectly in the melt, 0.58 g of $Mn(NO_3)_2 \cdot 6H_2O$ and $(NH_4)_2SO_4$ were added to the melt. Precipitation occurred, accompanying an increase in viscosity. After the stirring was ceased, temperature of the mixture was raised little by little up to 450° C. Thereafter, the mixture was ground, and the obtained precursor was subjected to thermal decomposition in a heating furnace at a temperature of 1,030° C. and at 10 Pa for one hour. A ZnS:Mn phosphor was thus obtained.

Example 5

A mixture of 100 g of urea and 15.6 g of $Y(NO_3)_3 \cdot 6H_2O$ was put in a separable flask. The temperature was kept at 150° C., and the mixture was thus melted. After the temperature was raised to 450° C., the obtained product was taken out and ground. Thereafter, 10% by weight of the thus ground product was mixed with the ZnS precursor, which had been prepared in Example 1, and the resulting mixture was ground with a ball mill for six hours. The thus ground mixture was fired in a vacuum heating furnace at a temperature of 1,050° C. and was oxidized. A ZnS:Mn phosphor having been coated with yttrium oxide was thus obtained. With photoluminescence measurement, the covered ZnS:Mn phosphor exhibited a light intensity enhanced by 23%. The light intensity exhibited by the precursor prepared in Example 1, which precursor had not been covered with yttrium oxide, was lower by 10% than the light intensity exhibited by the ZnS:Mn phosphor, which was produced in Example 1.

As described above, with the process for producing zinc sulfide particles in accordance with the present invention, the melt of urea is used as a solvent. Therefore, at the time at which the urea is decomposed, and the melt is solidified, the zinc sulfide formed in the melt does not readily agglomerate. Also, there is no risk that a hydrolysate will be formed as in cases where water is utilized as a solvent. Accordingly, the zinc sulfide particles are capable of being produced, while the zinc sulfide particles are being kept in a well dispersed state.

Also, with the process for producing zinc sulfide particles in accordance with the present invention, the temperature of the mixed melt is raised, and the precipitate of zinc sulfide is thereby formed. Therefore, the process for producing zinc sulfide particles in accordance with the present invention is free from the problems in that, if a precipitant is not uniformly added to a melt, uniformity of the zinc sulfide particles is not capable of being obtained, which problems occur with a technique wherein zinc sulfide is caused to precipitate by the addition of the precipitant. With the process for producing zinc sulfide particles in accordance with the present invention, the zinc sulfide particles having uniform particle size and free from inclusion of impurities are thus capable of being obtained.

What is claimed is:

1. A process for producing zinc sulfide particles, comprising the steps of:
    i) preparing a mixed melt, which contains urea and/or a urea derivative and contains a sulfur source and a zinc source,
    ii) raising the temperature of the mixed melt, a precipitate of zinc sulfide being thereby formed without any precipitant being added,
    iii) raising the temperature of the mixed melt even further, a solid material containing the zinc sulfide being thereby formed, and
    iv) firing the solid material, organic constituents contained in the solid material being thereby removed.

2. The process as defined in claim 1 wherein the sulfur source contains an $S^{2-}$ ion and/or an $S^{6+}$ ion.

3. The process as defined in claim 1 wherein the sulfur source is at least one compound selected from the group consisting of zinc sulfate, $(NH_4)_2SO_4$, and thiourea.

4. The process as defined in claim 2 wherein the sulfur source is at least one compound selected from the group consisting of zinc sulfate, $(NH_4)_2SO_4$, and thiourea.

5. The process as defined in claim 3 wherein zinc sulfate is utilized as both the sulfur source and the zinc source.

6. The process as defined in claim 4 wherein zinc sulfate is utilized as both the sulfur source and the zinc source.

7. The process as defined in claim 5 wherein the mixed melt further contains a doping agent.

8. The process as defined in claim 6 wherein the mixed melt further contains a doping agent.

9. A process for producing zinc sulfide particles having a surface covered with a metal compound, comprising the steps of:
    i) preparing a zinc sulfide particle precursor by:
        a) preparing a mixed melt, which contains urea and/or a urea derivative and contains a sulfur source and a zinc source,
        b) raising the temperature of the mixed melt, a precipitate of zinc sulfide being thereby formed without any precipitant being added,
        c) raising the temperature of the mixed melt even further, a solid material containing the zinc sulfide being thereby formed, and
        d) grinding the solid material,
    ii) preparing a metal compound-containing material by:
        a) preparing a mixed melt, which contains urea and/or a urea derivative and contains a metal compound,
        b) raising the temperature of the mixed melt, a solid material containing the metal compound being thereby formed, and
        c) grinding the solid material,
    iii) mixing the zinc sulfide particle precursor and the metal compound-containing material with each other,
    iv) firing the resulting mixture of the zinc sulfide particle precursor and the metal compound-containing material, organic constituents contained in the mixture of the zinc sulfide particle precursor and the metal compound-containing material being thereby removed, whereby the metal compound-containing material adheres to the surface of the particles of the zinc sulfide particle precursor, and
    v) obtaining zinc sulfide particles having a surface covered with a metal compound.

10. The process as defined in claim 9 wherein the sulfur source contains an $S^{2-}$ ion and/or an $S^{6+}$ ion.

11. The process as defined in claim 9 wherein the sulfur source is at least one compound selected from the group consisting of zinc sulfate, $(NH_4)_2SO_4$, and thiourea.

12. The process as defined in claim 10 wherein the sulfur source is at least one compound selected from the group consisting of zinc sulfate, $(NH_4)_2SO_4$, and thiourea.

13. The process as defined in claim 11 wherein zinc sulfate is utilized as both the sulfur source and the zinc source.

14. The process as defined in claim 12 wherein zinc sulfate is utilized as both the sulfur source and the zinc source.

15. The process as defined in claim 13 wherein the mixed melt of step i) further contains a doping agent.

16. The process as defined in claim 14 wherein the mixed melt of step i) further contains a doping agent.

* * * * *